United States Patent [19]
Rashkovskiy et al.

[11] Patent Number: 6,122,744
[45] Date of Patent: Sep. 19, 2000

[54] SELECTING A ROUTINE BASED ON PROCESSING POWER

[75] Inventors: Oleg B. Rashkovskiy, Cupertino; Ajaya V. Durg, Sunnyvale, both of Calif.

[73] Assignee: Intel Corporation, Santa Clara, Calif.

[21] Appl. No.: 09/082,140

[22] Filed: May 20, 1998

[51] Int. Cl.[7] .................................................... G06F 1/04
[52] U.S. Cl. .......................................... 713/300; 713/501
[58] Field of Search .................... 713/300, 323, 713/501

[56] References Cited

U.S. PATENT DOCUMENTS

| | | | |
|---|---|---|---|
| 5,418,565 | 5/1995 | Smith ........................................ | 348/273 |
| 5,511,204 | 4/1996 | Crump et al. ........................... | 713/300 |
| 5,778,413 | 7/1998 | Stevens et al. ......................... | 711/5 |
| 5,801,684 | 9/1998 | Uskali .................................... | 345/213 |
| 5,809,316 | 9/1998 | Gouzu ..................................... | 713/323 |
| 5,862,368 | 1/1999 | Miller et al. ........................... | 713/501 |
| 5,940,607 | 8/1999 | Hwang ................................... | 713/501 |

OTHER PUBLICATIONS

Lehoczky et al., "An Optimal Algorithm for Scheduling Soft–Aperiodic Tasks in Fixed–Priority Preemptive Systems", IEEE, pp. 110–123, 1992.

Davis et al., "Scheduling Slack Time in Fixed Priority Pre–Emptive Systems", IEEE, pp. 222–231, 1993.

Ripoll et al., "An Optimal Algorithm for Scheduling Soft Aperiodic Tasks in Dynamic–Priority Preemptive Systems", IEEE, vol. 23, No. 6, pp. 388–400, Jun. 1997.

*Primary Examiner*—Glenn A. Auve
*Attorney, Agent, or Firm*—Trop, Pruner & Hu, P.C.

[57] ABSTRACT

A method includes determining an operating frequency of a processor. Based on the operating frequency, a routine is selected from a group of at least two routines, and the selected routine is executed. The routine may also be selected based on an unused processing bandwidth that is available to the processor.

29 Claims, 4 Drawing Sheets

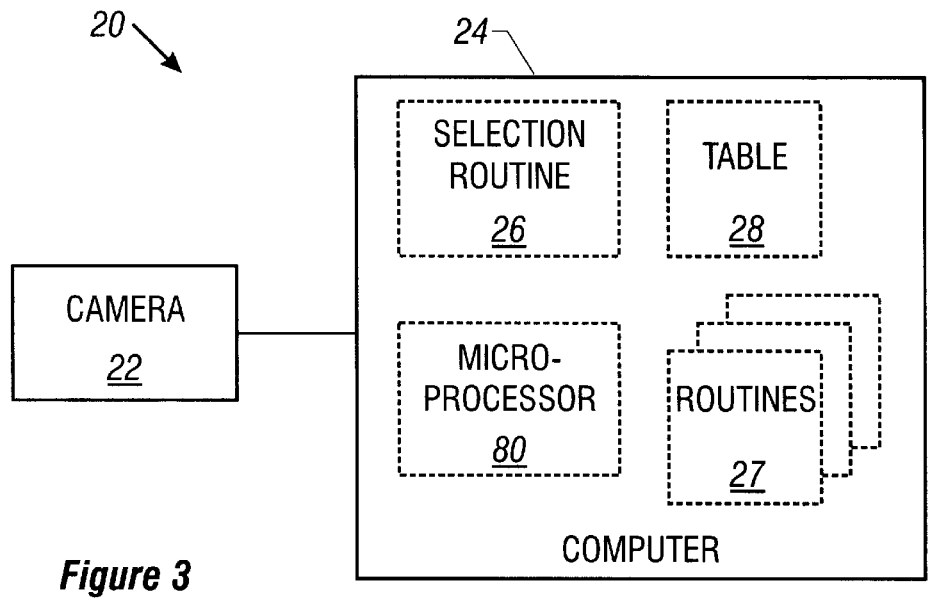
Figure 3
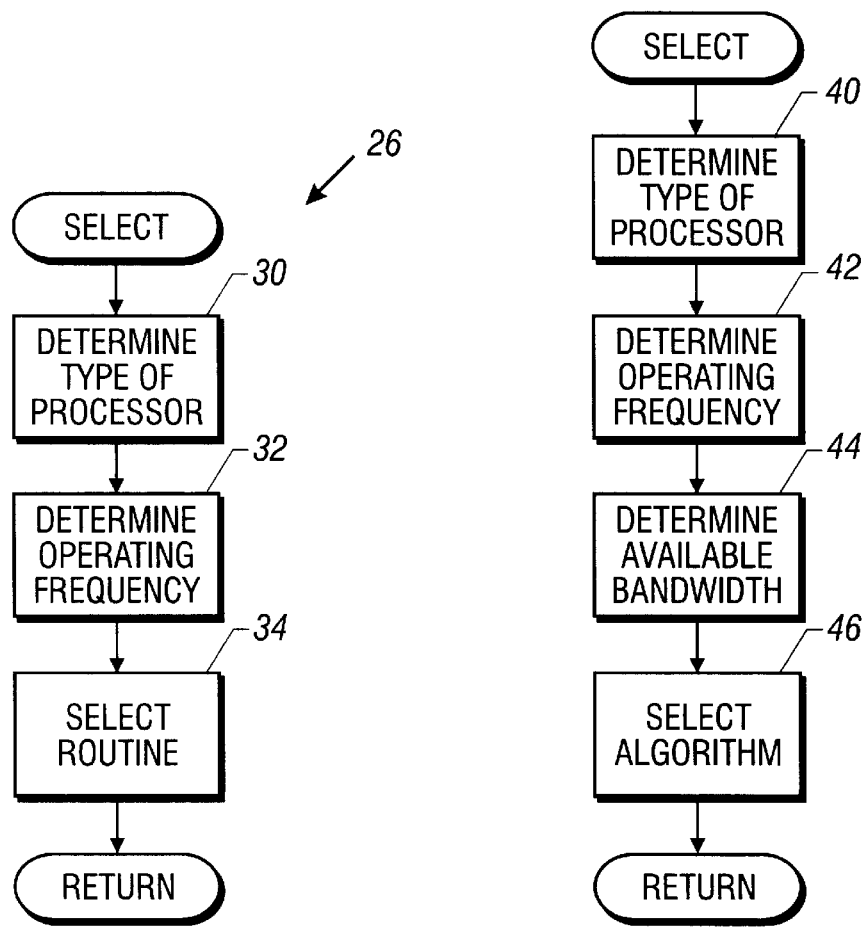
Figure 4
Figure 6

Figure 5

| PROCESSOR TYPE | ROUTINE POINTERS | | | | |
|---|---|---|---|---|---|
| $P_1$ | RT1 | RT1 | RT2 | | RT5 |
| $P_2$ | RT2 | RT3 | RT3 | | RT6 |
| ⋮ | | | | | |
| $P_M$ | RT4 | RT5 | RT6 | | RT8 |

| PROCESSOR TYPE | OPERATING FREQUENCY | | | | |
|---|---|---|---|---|---|
| | $F_1$ | $F_2$ | $F_3$ | ⋯ | $F_Q$ |
| $P_1$ | PTR1 | PTR1 | PTR2 | | PTR5 |
| $P_2$ | PTR1 | PTR1 | PTR2 | | PTR6 |
| ⋮ | | | | | |
| $P_M$ | PTR4 | PTR5 | PTR6 | | PTR8 |

| AVAILABLE BANDWIDTH | ROUTINE POINTERS | | | | |
|---|---|---|---|---|---|
| $B_1$ | RT1 | RT1 | RT2 | | RT5 |
| $B_2$ | RT2 | RT3 | RT3 | | RT6 |
| ⋮ | | | | | |
| $B_M$ | RT4 | RT5 | RT6 | | RT8 |

*Figure 8*

SELECTING A ROUTINE BASED ON PROCESSING POWER

BACKGROUND

The invention relates to selecting a routine based on processing power.

A computer may execute a routine to perform a function. Although the complexity of the routine may improve an output of the function, more complex routines typically require more computations and thus, more processing time by the computer. The processing time required to process the routine may also be a function of the available processing power of the computer.

For example, referring to FIG. 1, a typical digital camera 12 uses a rectangular array of pixel sensors 5 to electrically capture an optical image 11. To accomplish this, a shutter (not shown) of the camera 12 momentarily exposes the image 11 to the sensors 5 for a predetermined exposure time. After the exposure, each sensor 5 indicates an intensity of light from a portion of the image 11.

The camera 12 typically processes these indications to form a frame of data (which digitally represents the captured image) and transfers the frame of data (via a bus 15, for example) to a computer 14 for processing. For video, the camera 12 may capture several optical images and furnish several frames of data, each of which indicates one of the captured images. The computer 14 may then use the frames to recreate captured video on a display 8 or a printer 7.

Each pixel may be represented by several (three, for example) bytes which indicate the color components of the pixel. For example, if the color of each pixel is being represented in a red green blue (RGB) color space, then each pixel may be represented by three bytes: one byte representing the red component, one byte representing the green component and one byte representing the blue component.

Referring to FIG. 2, the computer 14 may process the stream of data to enhance, analyze and restore the images captured by the camera 12. For example, the camera 12 may provide a stream of data that represents an image 17 (only part of the image shown in FIG. 2) having a resolution of 320 columns by 240 rows. However, the computer 14 might desire an image 19 (only part of the image shown in FIG. 2) having a resolution of 640×480 and thus, may require a technique called upsampling, or interpolation, to obtain the color components for the additional, or "missing" pixels.

For example, to obtain the color components for pixels of the higher resolution image 19, the computer 14 may perform a 1:2 direct mapping. In this manner, the computer 14 may use the color components of some pixels (pixels 9, for example) of the lower resolution image 17 to obtain color components for pixels (pixels 22a and 22c, for example) of the higher resolution image 19. As a result of this direct mapping, some of the pixels (pixels 22a and 22c, as examples) of the higher resolution image 19 might have the same color components as corresponding pixels (pixels 9, as examples) of the lower resolution image 17.

However, the higher resolution image 19 has approximately twice as many pixels as the lower resolution image 17. As a result, the 1:2 mapping by the computer 14 does not furnish the color components for all pixels of the image 19. To fill in the color components for the remaining pixels, the computer 14 might use a color interpolation technique.

As an example, the computer may interpolate the color components for the pixel 22b by using the color components of pixels 22a and 22c that are adjacent to, or are "neighbors" to, the pixel 22b. In this manner, the computer 14 may average the color components of neighboring pixels 22a and 22c to obtain color components for the pixel 22b.

Generally, the accuracy of the interpolation is a function of the number of neighboring pixels used and the type of interpolation algorithm. For example, in general, an interpolation algorithm that uses two neighboring pixels may not be as accurate as an interpolation algorithm that uses eight neighboring pixels. Also, more accuracy may be achieved if, for example, distances to the neighboring pixels (for the pixel whose color components are being interpolated) are taken into account in the interpolation and if, for example, a nonlinear weighting technique (a spline-based interpolation algorithm, for example) is used.

Although the complexity of the interpolation algorithm may improve the quality of the image 19, in general, more computations are required for a more complex algorithm which, in turn, may require more computer processing time. The processing time may also be a function of the available processing power of the computer 14. For example, a type of processor being used by the computer 14, the operating frequency of the computer 14, and/or a bandwidth of the computer 14 that is available for interpolation processing may all affect the available processing power of the computer 14.

Providers of software for the computer 14 typically select routines (a routine that uses an interpolation algorithm, for example) to accommodate a wide range of processing powers and thus, a wide range of computers. However, by trying to accommodate such a wide range, the quality of data produced by the routine may not be optimized for the available processing power of the computer.

Thus, there is a continuing need for a system which efficiently accommodates computers of varying processing powers.

SUMMARY

In one embodiment, a method includes determining an operating frequency of a processor. Based on this determination, a routine is selected from a group of at least two routines, and the selected routine is executed.

In another embodiment, an article includes a processor readable storage medium that includes instructions. The instructions cause a processor to determine a processing bandwidth being used by the processor and determine an unused processing bandwidth available for additional processing. Based on the unused processing bandwidth, the instructions caused the processor to select a routine from a group of at least two routines. The instructions further cause the processor to execute the selected routine.

BRIEF DESCRIPTION OF THE DRAWING

FIG. 3 is a block diagram of a digital imaging system according to an embodiment of the invention.

FIGS. 4 and 6 are flow diagrams of selection routines to select various software routines.

FIGS. 5, 7 and 8 are illustrations of look-up tables used by the selection routines.

DETAILED DESCRIPTION

Figure 1:
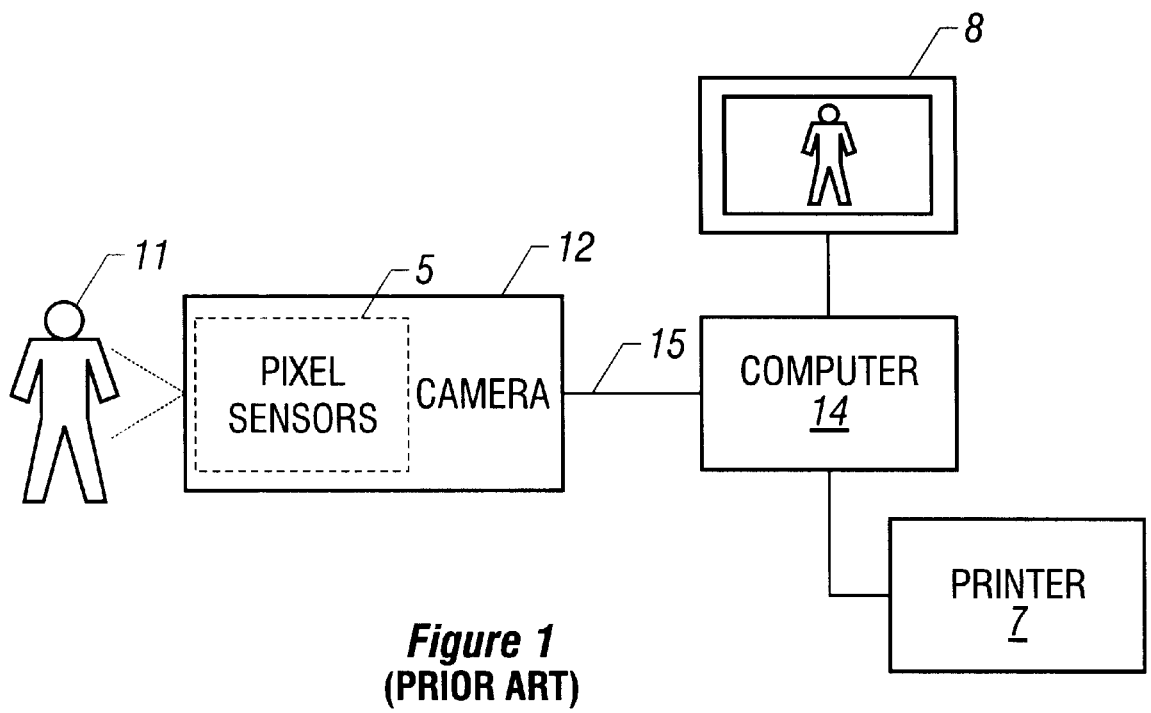
FIG. 1 is a block diagram of a digital imaging system of the prior art.
Figure 2:
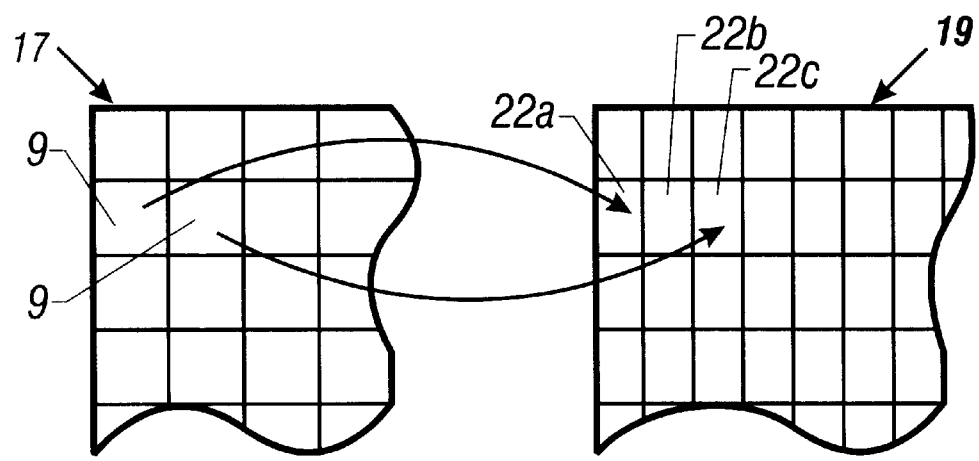
FIG. 2 is an illustration of a mapping function that maps color components of a low resolution image to color components of a higher resolution image.

Referring to FIG. 3, an embodiment 20 of a video imaging system in accordance with one embodiment of the invention includes a computer 24 and a camera 22. Through the use of software routines, the computer 24 may perform digital imaging functions which may include scaling, enhancing and/or restoring image data that is furnished by the camera 22. To optimize both the time to perform any one of these functions and the quality of the data produced by the function, the computer 24 may first execute a selection program 26 before performing the function. The selection program 26 may cause the computer 24 to evaluate the available processing power of the computer 24, and based on this evaluation, select an executable software routine 27 (from a group of routines 27) which is then executed by the computer 24 to perform the function.

Although any one of the routines 27 may be executed to perform the function, the different routines 27 may vary in complexity and may produce different qualities of data. For example, some of the routines 27 may produce data that, when used to render an image on a display, produces a more visually appealing image than the data produced by some of the other routines 27. As another example, some of the routines 27 may be more complex and thus, require more calculations by the computer 24 than some of the other routines 27. However, the routines 27 that require more calculations may produce higher quality outputs. As an example, for the case of digital image processing, a routine 27 that requires more calculations may cause the computer 24 to produce an image that is more visually appealing.

To ensure excessive processing time is not consumed by the computer 24, the selection program 26, in some embodiments, selects the routine 27 that produces the highest quality output for an allotted, predetermined processing time. The predetermined processing time might be selected based on the type (interpolation or scaling functions, as examples) of the particular function and may be a user configurable option.

As a result of this selection technique, computers having more processing power may execute more complicated routines 27, and computers having less processing power may execute less complicated routines 27. For example, the function may relate to upsampling or converting a low resolution image to a higher resolution image. If the computer 24 has a relatively small available processing power, the selection routine 26 may cause the computer 24 to select a routine 27 that uses a linear interpolation algorithm to perform the scaling. Although linear interpolation algorithms are generally faster, the linear algorithms may produce lower quality data. Conversely, if the computer 24 has a relatively large available processing power, the selection routine 26 may cause the computer 24 to select a routine 27 that uses a more complicated interpolation algorithm (an algorithm that uses a sync filter function, for example) but furnishes a higher quality output.

The advantages of selecting a routine based on available processing power may include one or more of the following. Processing time may be optimized. Data quality may be optimized. Routines for future processors may be installed on the computer. For digital image processing, the cost of the digital camera is minimized, as processing functions may be performed by the computer.

In some embodiments, the selection routine 26 may evaluate the available processing power of the computer 24 based on a number of different factors. As example, a type of microprocessor 80 (a Pentium® microprocessor, a Pentium II® microprocessor or a Pentium® microprocessor with MMX® technology, as examples) that the computer 24 uses to execute instructions of the routine 27, the operating frequency of the microprocessor 80, and the available bandwidth of the microprocessor 80 (for executing the routine 27) may be used to determine the available processing power of the computer 24.

The available, or unused processing bandwidth of the computer 24 generally refers to the bandwidth of the computer 24 that is not being currently used by other executing programs.

Referring to FIG. 4, in some embodiments, the selection routine 26 may (upon execution by the microprocessor 80, for example) cause the computer 24 to determine (block 30) the type of the microprocessor 80 and determine (block 32) the operating frequency of the microprocessor 80. The computer 24 may determine the type of the processor by, for example, executing a CPU identification utility application program, such as a utility application program called CPUID.EXE available from Intel's website at "http://developer.intel.com/design/perftool/cpuid/index.htm." The computer 24 may determine the operating frequency of the processor 19 by, for example, executing the following C code to call a function of a basic input/output system (BIOS) of the computer 24:

```
unsigned long cpunormspeed (int clocks)
{
    struck FREQ_INFO cpu_speed;
    HKEY hKey;
    LPBYTE ProcSpeed;
    DWORD buflen, ret;
    if (!RegOpenKeyEx (HKEY_LOCAL_MACHINE, "HARDWARE\\
DESCRIPTION\\System\\CentralProcessor\\0", 0, KEY_READ,
& hKey))
    {
        ProcSpeed = 0;
        buflen = sizeof (ProcSpeed);
        ret=RegQueryValueEx (hKey, "-MHz", NULL, NULL,
(LPBYTE) &ProcSpeed, &buflen);
        if (ret != ERROR_SUCCESS)
            ret=ReqQueryValueEx (hKey, "-Mhz", NULL, NULL,
(LPBYTE) &ProcSpeed, &buflen);
        if (ret != ERROR_SUCCESS)
            ret=ReqWueryValueEx (hKey, "-mhz", NULL, NULL,
(LPBYTE) &ProcSpeed, &buflen);
        RegCloseKey (hKey);
        if (ret == ERROR_SUCCESS)
            return (unsigned long) ProcSpeed;
    }
    cpu_speed = cpuspeed(clocks);
    return cpu_speed.norm_freq;
}
```

Based on the type of microprocessor 80 and the operating frequency, the routine 26 may then cause the computer 24 to select (block 34) one of the routines 27 to perform the desired function.

Referring to FIG. 5, in some embodiments, the selection of the routines 27 may be aided by a look-up table 28. The look-up table 28 may include routine identifiers 37 that point to different routines 27. In this manner, the computer 24 selects one of the identifiers 37 based on, for example, the type of the microprocessor 80 and the operating frequency of the microprocessor 80. More than one of the identifiers 37 may identify the same routine 27.

In some embodiments, the selection routine 26 may use more than one look-up table. For example, referring to FIGS. 7 and 8, the selection routine 26 may cause the computer 24 to use two look-up tables 43 and 45. The table 43 includes pointers 35 that point to columns of the table 45. In this manner, the computer 24 selects the pointers 35 based on, for example, the type of the microprocessor 80 and the operating frequency of the microprocessor 80. As an example, for an operating frequency $F_3$ and a processor type $P_2$, the computer selects the identifier 35 called PTR2.

The selected pointer 35, in turn, points to one of the columns of the table 45 which includes different routine identifiers 57 which point to different routines 27. The computer 24 selects an entry of the selected column based on the available bandwidth ($B_1, B_2 \ldots B_m$) of the computer 24.

In this manner, to use the tables 43 and 45, the selection routine 26 causes the computer 24 to determine (block 40 (see FIG. 6)) the type of microprocessor 80 (used to execute the routine 27), determine (block 42) the operating frequency of the microprocessor 80 and determine (block 44) the available processing bandwidth. The available processing bandwidth is the unused bandwidth that is available to the processor for executing additional instructions. Based on the type of operating frequency, the selection routine 26 causes the computer 24 to select the appropriate pointer 35 from the table 43 (block 46) and using the pointer and the bandwidth, select the appropriate routine 27 from the table 45.

There are a number of different ways to determine the available bandwidth of the computer 24. For example, for a Windows® operating system, the selection program 26 may cause the computer 24 to base a determination of the available processing bandwidth on the number of processes that are created and the priority of these processes. The selection program 26 might also consider the priority of threads that are being used in these processes. The selection program 26 may also consider the type of application programs that are currently being executed by the computer 24 and the application program that is currently executing as a foreground process. The determination may also use, for example, a Windows® application program called SYSMON.EXE which accesses the Performance Registry of Windows® and allows monitoring of system performance and resources.

Figure 9:
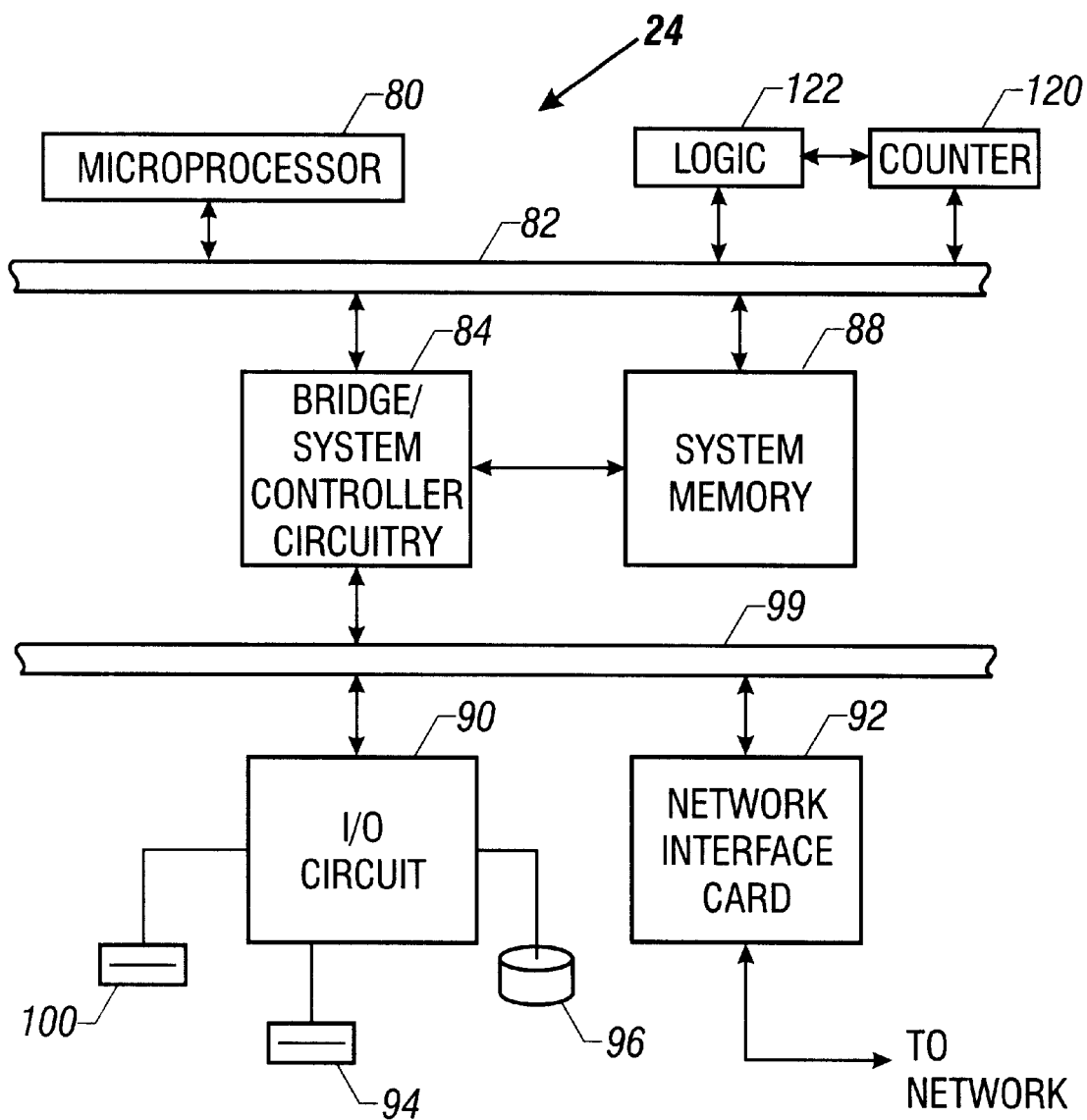
FIG. 9 is a block diagram of a computer of the imaging system of FIG. 3.

The determination of available processing bandwidth may also be based on hardware observations. For example, referring to FIG. 9, in the computer 24, logic 122 coupled to a local bus 82 may increment a counter 120 whenever the bus 82 is active. In this manner, the selection program 26 may cause the microprocessor 80 to periodically read a value (a count, for example) from the counter 120 and based on this value, determine the available processing bandwidth.

The computer 24 might also include a system memory 88 which might store, for example, a copy of the selection routine 26 and the tables 29, 43 and/or 45. In some embodiments, the microprocessor 80 executes the selection routine 26 to determine a type of the microprocessor 80; to determine an operating frequency of the microprocessor 80; and based on the type and operating frequency, to select one of the routines 27. The microprocessor 80 might also base the selection on an available processing bandwidth of the microprocessor 80. After the selection of the routine 27, the microprocessor 80 may then execute the selected routine.

The memory 88, the microprocessor 80 and the bridge/system controller circuitry 84 are all coupled to the local bus 82. The circuitry 84 also interfaces the host bus 82 to a downstream bus 99 which is coupled to an I/O controller 90 and a network interface card 92, as examples. The computer 24 may also have, as examples, a CD-ROM drive 100, a floppy disk drive 94 and/or a hard disk drive 96.

In other embodiments, the computer system may include multiple microprocessors, and some of these microprocessors might perform the above-stated functions that are performed by the microprocessor 80.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed:

1. An article comprising a processor readable storage medium storing instructions to cause a processor to:

determine an operating frequency of the processor;

select a routine from a group of at least two routines, the selected routine being adapted to substantially optimize execution of the selected routine at the determined frequency relative to the remaining said at least two routines; and execute the selected routine.

2. The article of claim 1, wherein the medium further stores instructions to cause the computer to call a BIOS function to determine the operating frequency.

3. The article of claim 1, wherein the medium further stores instructions to determine a type of the processor and further base the selection of the routine on the type.

4. The article of claim 3, wherein the medium further stores instructions to cause the computer to use the type of processor and the operating frequency to retrieve an identifier that identifies the selected routine.

5. The article of claim 1, wherein the routines comprise digital imaging routines.

6. The article of claim 5, wherein the digital imaging routines comprise an interpolation routine.

7. An article comprising a processor readable storage medium comprising instructions to cause a processor to:

determine a processing bandwidth being used by the processor;

determine an unused processing bandwidth available for additional processing by the processor;

based on the unused processing bandwidth, select a routine from a group of at least two routines; and execute the selected routine.

8. The article of claim 7, wherein the medium further stores instructions to cause the processor to determine a type of the processor, and based on the type and the unused processing bandwidth, select the routine from the group.

9. The article of claim 8, wherein the instructions to cause the processor to determine the type include an assembly language instruction.

10. The article of claim 7, wherein the medium further stores instructions to cause the processor to determine an operating frequency of the processor, and based on the operating frequency and the unused processing bandwidth, select the routine from the group.

11. The article of claim 10, wherein the instructions to cause the processor to determine the operating frequency includes a BIOS function call.

12. The article of claim 7, wherein the storage medium further stores instructions to cause the processor to use a type of the processor an operating frequency of the processor to retrieve an identifier that identifies the selected routine.

13. The article of claim 7, wherein the routines comprise digital imaging routines.

14. The article of claim 13, wherein the routines comprise an interpolation routine.

15. A method for use with a processor, comprising:
- determining an unused processing bandwidth available for additional processing by the processor;
- based on the unused processing bandwidth, selecting a routine from a group of at least two routines; and
- executing the selected routine.

16. The method of claim 15, further comprising:
- determining an operating frequency of the processor; and
- further basing the selection on the operating frequency.

17. The method of claim 15, further comprising:
- determining a type of the processor; and
- further basing the selection on the type of processor.

18. The method of claim 15, further comprising:
- calling an API function to determine the unused processing bandwidth.

19. The method of claim 15, further comprising:
- determining an operating frequency of the processor;
- determining a type of the processor; and
- further basing the selection on the operating frequency and the type of processor.

20. An article comprising a processor readable storage medium storing instructions to cause a processor to:
- determine a processing bandwidth being used by the processor;
- determine an unused processing bandwidth available for additional processing by the processor;
- select a routine from a group of at least two routines, the selected routine being adapted to substantially optimize execution of the selected routine using at least a portion of the determined unused processing bandwidth relative to the remaining said at least two routines; and
- execute the selected routine.

21. The article of claim 20, wherein the medium further stores instructions to cause the processor to determine a type of the processor, and based on the type and the unused processing bandwidth, select the routine from the group.

22. The article of claim 20, wherein the medium further stores instructions to cause the processor to determine an operating frequency of the processor, and based on the operating frequency and the unused processing bandwidth, select the routine from the group.

23. The article of claim 20, wherein the storage medium further stores instructions to cause the processor to use a type of the processor and an operating frequency of the processor to retrieve an identifier that identifies the selected routine.

24. The article of claim 20, wherein the routines comprise digital imaging routines.

25. The article of claim 20, wherein the routines comprise an interpolation routine.

26. A method for use with a processor, comprising:
- determining an unused processing bandwidth available for additional processing by the processor;
- selecting a routine from a group of at least two routines, the selected routine being adapted to substantially optimize execution of the selected routine using at least a portion of the determined unused processing bandwidth relative to the remaining said at least two routines; and
- executing the selected routine.

27. The method of claim 26, further comprising:
- determining an operating frequency of the processor; and
- further basing the selection on the operating frequency.

28. The method of claim 26, further comprising:
- determining a type of the processor; and
- further basing the selection on the type of processor.

29. The method of claim 26, further comprising:
- determining an operating frequency of the processor;
- determining a type of the processor; and
- further basing the selection on the operating frequency and the type of processor.

* * * * *